United States Patent [19]
Toy et al.

[11] Patent Number: 5,281,255
[45] Date of Patent: Jan. 25, 1994

[54] GAS-SEPARATION PROCESS

[75] Inventors: Lora G. Toy, San Francisco; Ingo Pinnau; Richard W. Baker, both of Palo Alto, all of Calif.

[73] Assignee: Membrane Technology and Research, Inc, Menlo Park, Calif.

[21] Appl. No.: 971,331

[22] Filed: Nov. 4, 1992

[51] Int. Cl.$^5$ .................. B01D 53/22; B01D 71/06
[52] U.S. Cl. .............................. 95/50; 96/4; 55/524
[58] Field of Search ............... 55/16, 68, 158, 524

[56] References Cited

U.S. PATENT DOCUMENTS

| | | | |
|---|---|---|---|
| 4,689,267 | 8/1987 | Takamizawa et al. | 55/158 X |
| 4,714,481 | 12/1987 | Matsuura et al. | 55/68 X |
| 5,013,338 | 5/1991 | Anand et al. | 55/158 |
| 5,051,113 | 9/1991 | Nemser | 55/16 |
| 5,051,114 | 9/1991 | Nemser et al. | 55/16 |
| 5,053,059 | 10/1991 | Nemser | 55/16 |
| 5,069,686 | 12/1991 | Baker et al. | 55/71 X |
| 5,147,417 | 9/1992 | Nemser | 55/16 |

FOREIGN PATENT DOCUMENTS

| | | | |
|---|---|---|---|
| 03-221130 | 9/1991 | Japan | 55/158 |
| WO89/06158 | 7/1989 | PCT Int'l Appl. | 55/16 |
| WO90/15662 | 12/1990 | PCT Int'l Appl. | 55/158 |

*Primary Examiner*—Robert Spitzer
*Attorney, Agent, or Firm*—J. Farrant

[57] ABSTRACT

A process for separating condensable organic components from gas streams. The process makes use of a membrane made from a polymer material that is glassy and that has an unusually high free volume within the polymer material.

23 Claims, 6 Drawing Sheets

GAS-SEPARATION PROCESS

This invention was made with Government support under Contract Number DE-FG03-90ER81066, awarded by the Department of Energy. The Government has certain rights in this invention.

FIELD OF THE INVENTION

The invention relates to a gas-separation process. More particularly, the invention concerns the removal of condensable organic vapors from gas mixtures, especially the removal of hydrocarbons from gas mixtures.

BACKGROUND OF THE INVENTION

Gas-separation membranes are known and are in use in such areas as production of oxygen-enriched air, production of nitrogen for blanketing and other applications, separation of carbon dioxide from methane, hydrogen recovery from various gas mixtures and removal of organic vapors from air.

The optimum separation membrane for use in any gas-separation application combines high selectivity with high flux. Thus the membrane-making industry has engaged in an ongoing quest for membranes with improved flux/selectivity performance.

Gas and vapor permeation through polymer membranes is usually rationalized by the solution-diffusion model. This model assumes that the gas phases on either side of the membrane are in thermodynamic equilibrium with their respective polymer interfaces, and that the interfacial sorption and desorption process is rapid compared with the rate of diffusion through the membrane. Thus the rate-limiting step is diffusion through the polymer membrane, which is governed by Fick's law of diffusion. In simple cases, Fick's law leads to the equation $$Q = (J/\Delta p) = (D \cdot S)/l, \quad (1)$$

where Q is the pressure-normalized flux [cm$^3$(STP)/cm$^2 \cdot$s$\cdot$cmHg], J is the volumetric flux per membrane area [cm$^3$(STP)/cm$^2 \cdot$s], D is the diffusion coefficient of the gas or vapor in the membrane [cm$^2$/s] and is a measure of the gas mobility, l is the membrane thickness, S is the Henry's law sorption coefficient linking the concentration of the gas or vapor in the membrane material to the pressure in the adjacent gas [cm$^3$(STP)/cm$^3 \cdot$cmHg], and $\Delta p$ is the pressure difference across the membrane. The product D·S can also be expressed as the permeability coefficient, P, a measure of the rate at which a particular gas or vapor moves through a membrane of standard thickness (1 cm) under a standard pressure difference (1 cmHg). As can be seen from Equation 1, the pressure-normalized flux is inversely proportional to the membrane thickness.

For a given membrane material, the ideal selectivity, $\alpha_{A,B}$, for gas A over B is defined as the ratio of the permeability coefficients of the gases:

$$\alpha_{A,B} = P_A/P_B = (D_A/D_B) \cdot (S_A/S_B), \quad (2)$$

where $P_A$ and $P_B$ are the permeability coefficients of gases A and B, respectively, as determined from the measured pressure-normalized fluxes of two gases, the fluxes being measured separately, each with a pure gas sample, through a defect-free membrane sample of the same thickness, and being expressed in cm$^3$(STP)/cm$^2 \cdot$s$\cdot$cmHg or other consistent units. Selectivity, as defined in Equation 2, is a product of two terms. The first term is the ratio of the diffusion coefficients and is usually called the mobility selectivity. This term reflects the relative size of the permeants. In the case of the separation of organic compounds from permanent gases, such as nitrogen, the diffusion coefficient of the organic vapor is always less than that of nitrogen, so the mobility selectivity term is less than one. The second term is the sorption selectivity and reflects the relative sorption of the two permeants. In general, the more condensable the component, the higher its sorption. Thus, in the case of the separation of a more condensable organic compound from a permanent gas or less condensable organic or inorganic compound, the sorption selectivity term will usually be greater than one. Whether a particular material membrane is selective for the more condensable components of a gas mixture depends on the balance of these two terms for that material.

Diffusion coefficients are generally several orders of magnitude higher in rubbery polymers than in glassy polymers and are substantially less dependent on the penetrant size, particularly in the case of large, condensable molecules. As a result, the selectivity of rubbery polymers is mainly determined by the sorption term and rubbery materials are usually condensable-selective. Glassy polymer selectivities, on the other hand, are dominated by the diffusion term and glassy polymers are usually gas-selective. Data illustrating the standard behavior of rubbery and glassy polymers are shown in FIG. 2, originally prepared by the German company, GKSS. Only rubbery polymers, therefore, have been considered useful for separating condensable organic compounds from other gases and vapors.

In recent years, some polymer materials with unusually high permeabilities have been synthesized. Perhaps the best known of these, and representative of the class, is polytrimethylsilylpropyne (PTMSP), a polymer synthesized by T. Masuda et al. in Japan. Although PTMSP is glassy, up to at least about 200° C., it exhibits an oxygen permeability of 10,000 Barrer or above, more than 15 times higher than that of silicon rubber, previously the most permeable polymer known. The selectivity for oxygen/nitrogen, however, is low (1.5-1.8). The high permeability appears to be associated with an unusually high free-volume within the polymer material, and has been confirmed with many examples of pure gases and vapors, including oxygen, nitrogen, hydrogen, helium, methane, ethane, propane, butane and higher hydrocarbons, sulfur hexafluoride and carbon dioxide. These pure-gas data suggest that PTMSP will exhibit poor selectivity for most gas separations. For example, a paper by N. A. Platé et al. ("Gas and vapor permeation and sorption in poly(trimethylsilylpropyne", Journal of Membrane Science, Vol. 60, pages 13-24, 1991) gives polymer permeabilities of 2.6×10$^{-7}$ cm$^3$(STP)·cm/cm$^2 \cdot$s$\cdot$cmHg for oxygen and 1.5×10$^{-7}$ cm$^3$(STP)·cm/cm$^2 \cdot$s$\cdot$cmHg for nitrogen, giving a calculated selectivity of 1.7. The same reference gives polymer permeabilities of 2.7×10$^{-7}$ cm$^3$(STP)·cm/cm$^2 \cdot$s$\cdot$cmHg for methane, 1.9×10$^{-7}$ cm$^3$(STP)·cm/cm$^2 \cdot$s$\cdot$cmHg for propane and 2.3×10$^{-7}$ cm$^3$(STP)·cm/cm$^2 \cdot$s$\cdot$cmHg for n-butane, giving a calculated selectivity for propane/methane of 0.7 and for butane/methane of 0.85. A paper by M. Langsam et al. ("Substituted Propane Polymers. I. Chemical surface modification of poly[1-(trimethylsilyl)propane] for gas separation membranes", Gas Separation and Purification, Vol. 2, pages 162-170, 1988) gives a carbon dioxide/methane selectivity for PTMSP of 2.07, compared with 9.56 for silicon rubber. A paper by K. Takada et al. ("Gas Permeability of Polyacetylenes Carrying Substituents", Journal of Applied Polymer Science, Vol. 30, pages 1605-1616, 1985) includes the statement that: "Very interestingly, poly[1-(trimethylsilyl)-1-propyne] films show permeability coefficients as high as $10^{-7}$-$10^{-6}$ to every gas. However, permselectivities of these films for two different gases are relatively poor." Thus the material was characterized, at least initially, as of great academic interest, because of its extraordinary permeability, but exhibiting selectives too low for commercial use.

As soon as its remarkable permeability properties were announced, PTMSP attracted attention from the membrane community at large. A number of experimenters reported that the permeation properties of PTMSP appear to be unstable over time, raising further doubts as to the usefulness of the material for practical applications. In particular, the oxygen permeability was found to drop dramatically. For example, Masuda et al. found that the oxygen permeability fell to about 1% of its original value when the membrane was left at room temperature for several months.

More recently, the consensus of opinion in the art has been that the loss in permeability arises primarily from sorption of volatile materials from the environment of the membrane. If the membrane is mounted in a system containing a vacuum pump, for example, vaporized or aerosol vacuum oil may be sorbed into the membrane material. A similar effect may occur if the membrane is simply standing in the air for prolonged periods. For example, a paper by T. Nakagawa et al. ("Polyacetylene derivatives as membranes for gas separation", Gas Separation and Purification, Vol. 2, pages 3-8, 1988) states that "the PMSP membrane showed strong affinity to volatile materials. It was considered that, in addition to the thermal hysteresis, the reason for unstable gas permeability is the adsorption of volatile materials existing in the atmosphere."

This property has been turned to advantage by several workers. For example, the above-cited Nakagawa paper also discusses the performance of PTMSP membranes that have been deliberately exposed to a variety of additives, including dioctyl phthlate (DOP) and polyethylene glycol (PEG). The treated membranes exhibited permeation properties stable over time, and, although the oxygen permeability was reduced from 8,000 Barrer to about 300-400 Barrer, the oxygen/nitrogen selectivity improved from 1.6 to 3.3, rendering the membranes "prospective as membranes for oxygen enrichment". Similar results have been reported by S. Asakawa et al. ("Composite membrane of poly[1-(trimethylsilyl)-propyne] as a potential oxygen separation membrane", Gas Separation and Purification, Vol. 3, pages 117-122, 1989), who apparently produced stable PTMSP membranes by coating the PTMSP layer with a protective layer of silicone rubber, and who also concluded that, "This membrane, therefore, may be promising for industrial oxygen separation." M. Langsam et al. (U.S. Pat. No. 4,859,215, Aug.22, 1989, assigned to Air Products and Chemicals, Inc.) added Nujol oil, silicone oil or ethylene oxide-based surfactants to the casting solution when preparing PTMSP membranes. The membranes showed permeation properties stable over time, reduced permeabilities and improved selectivities for oxygen/nitrogen and carbon dioxide/nitrogen.

Other attempts to modify the material to increase its selectivity have been made. For example, U.S. Pat. No. 4,657,564, to M. Langsam, assigned to Air Products and Chemicals, Inc., describes a surface fluorination technique that increases the oxygen/nitrogen selectivity by at least 50% over its unmodified value. Thus, use of the material has focused on oxygen/nitrogen separation, and ways in which the extraordinary oxygen permeability can be preserved yet the low oxygen/nitrogen selectivity enhanced.

Almost all of the permeation data that have been published concern pure gas experiments. However, a study by S. R. Auvil et al. ("Mechanisms of gas transport in poly(1-trimethylsilyl-1 propyne), Polymer Preprints, Vol. 32(3), pages 380-383, 1991) was carried out using mixtures of a heavy gas (carbon dioxide or sulfur hexafluoride) and a light gas (helium or nitrogen). The study showed that the permeability of the light gas is substantially reduced in the presence of the heavy gas. It was postulated that the heavy gas is adsorbed onto surfaces of voids within the structure of the polymer and may be transported through the material by surface diffusion, and further that these surface layers may build up and block diffusion of the light gas through the void areas. The net result was an increase in the selectivity for the heavy gas over the light gas when measured with gas mixtures rather than calculated from pure gas permeabilities.

To summarize the above discussion, it may be seen that glassy, high-free-volume polymers, of which PTMSP is the most widely studied example, exhibit unusual gas transport properties. These properties do not conform to, and do not appear to follow from the standard solution/diffusion model of gas transport. Furthermore, the properties are affected in a not fully understood fashion by sorption of a variety of volatile materials. Behavior with mixed gases has not been studied, except in a very limited way, but the results obtained again are inconsistent with those obtained from conventional polymer materials.

SUMMARY OF THE INVENTION

The invention is a process for separating a condensable organic component from a gas stream. The process involves running the gas stream containing the condensable organic component across a membrane that is selectively permeable to that component. The condensable component is therefore concentrated in the stream permeating the membrane; the residue, non-permeating, stream is correspondingly depleted in condensable content. The process differs from processes previously used for separating condensable organic components from gas streams in the nature of the membrane that is used.

The membrane is made from a polymer material characterized as follows:
1. Glassy
2. Unusually high free volume within the polymer material
3. Pure gas data suggest poor selectivity
4. Measured mixed gas selectivity is substantially better than calculated pure gas selectivity
5. Selectivity of material depends on thickness The membrane material has characteristics and exhibits properties that are fundamentally different from those of the membranes previously used for this type of separation.

Because the materials are glassy and rigid, an unsupported film of the polymer may often be usable as a single-layer gas separation membrane. Alternatively, the separation membrane may be a layer that forms part of a thicker structure, such as an asymmetric membrane or a composite membrane.

The driving force for permeation across the membrane is the pressure difference between the feed and permeate sides, which can be generated in a variety of ways. The membrane separation process produces a permeate stream enriched in the condensable component compared with the feed and a residue stream depleted in the condensable component.

The membrane separation process may be configured in many possible ways, and may include a single membrane unit or an array of two or more units in series or cascade arrangements. Eighty to 90% or above removal of the condensable content of the feed to the membrane system can typically be achieved with an appropriately designed membrane separation process.

The process is useful in separating any condensable organic compound from air, permanent gases, or less condensable organic or inorganic compounds. The process has advantages over processes that were previously used for such separations in that it combines high flux of the condensable component with unexpectedly high selectivity for the condensable component.

It is to be understood that the above summary and the following detailed description are intended to explain and illustrate the invention without restricting its scope.

DETAILED DESCRIPTION OF THE INVENTION

Figure 1:
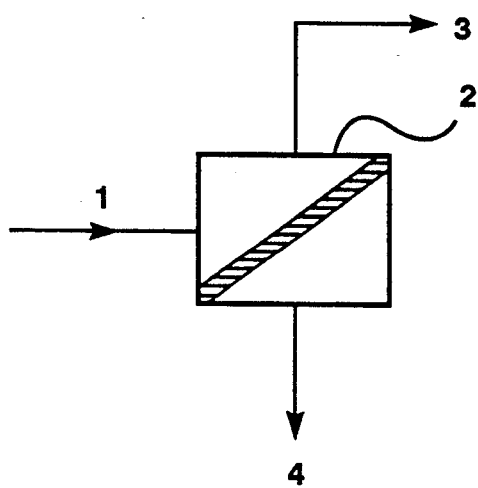
FIG. 1 is a schematic drawing of the process of the invention in its simplest form.
Figure 2:
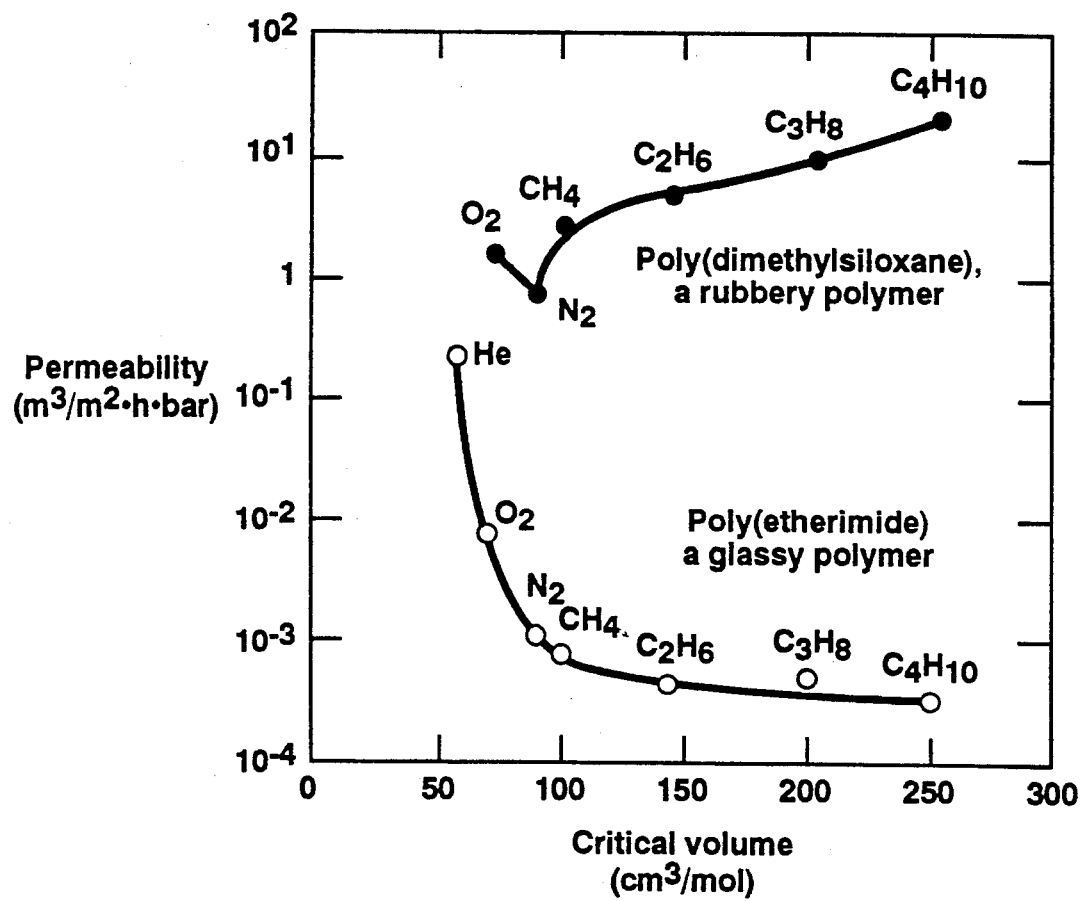
FIG. 2 is a graph of permeability as a function of molecular size, expressed as critical volume, for a typical rubbery and a typical glassy polymer.

The term membrane unit as used herein means one or more membrane modules arranged in parallel, so that a portion of the incoming gas stream passes through each one.

The term series arrangement means an arrangement of membrane modules or units connected together such that the residue stream from one module or unit becomes the feedstream for the next.

The term cascade arrangement means an arrangement of membrane modules or units connected together such that the permeate stream from one module or unit becomes the feedstream for the next.

The process of the invention involves running a gas stream containing at least two components, at least one of which is a condensable organic compound, across a membrane that is selectively permeable to the condensable component over the second component. The term condensable as used herein refers to fluids below their critical temperatures, having boiling points greater than $-50°$ C. at atmospheric pressure. If a mixture containing two or more condensable components is to be treated, the term condensable refers to the more readily condensable component or components.

The gas streams that may be treated by the process of the invention are diverse. By way of non-limiting example, many industrial processes produce gas streams containing organic vapors in air or nitrogen. Such organic vapors may be aliphatic or aromatic hydrocarbons, for example, or halogenated hydrocarbons, such as fully or partially substituted chlorinated hydrocarbons, fluorinated hydrocarbons and chlorofluorocarbons (CFCs and HCFCs). Streams of organic compounds in other gases are also found. For example, hydrogenation reactions in the chemical industry yield off-gas streams containing hydrogen and various hydrocarbons. Mixed organic compound streams occur, particularly in chemical processing, petrochemical refining and natural gas treatment.

The process differs from processes previously used for separating condensable components from gas streams in the nature of the membrane that is used. As discussed in the background section above, the conventional belief of the art is that rubbery membranes should be used when a condensable organic compound is to be separated from a gas mixture. For example, U.S. Pat. No. 4,857,078, which concerns removal of $C_{3}+$ hydrocarbons from natural gas, states that: "Glassy polymers . . . are, however, relatively unselective for one hydrocarbon over another, and are unsuitable for separating methane or ethane from $C_3$ or $C_{3}+$ hydrocarbons. In fact, these types of membrane often are more permeable to methane than to the $C_{2}+$ hydrocarbons." (column 2, lines 46-52). The patent goes on to describe suitable membranes for this particular condensable/non-condensable separation, as follows: "The permselective membranes used in the invention then are rubbery non-crystalline polymers, that is they have a glass transition temperature at least 20° C. below the normal operating temperature of the system. Thermoplastic elastomers are also useful." (column, 7, lines 8-12). Likewise, U.S. Pat. No. 5,089,033, which covers a hybrid process including condensation and membrane separation for removing condensable components in general from gas streams, states that: "To remove an organic vapor as the preferentially permeating component, a number of rubbery polymers could be used. Examples include nitrile rubber, neoprene, silicone rubbers, including polydimethylsiloxane, chlorosulfonated polyethylene, polysilicone-carbonate copolymers, fluoroelastomers, plasticized polyvinylchloride, polyurethane, cis-polybutadiene, cis-polyisoprene, poly(butene-1), polystyrene-butadiene c styrene/butadiene/styrene block copolymers and styrene/ethylene/butylene block copolymers. Particularly preferred rubbers are silicone rubbers." (Col. 9, lines 29-41).

In complete contrast to these teachings, the membranes that are used to separate condensable organic components from gas streams according to the present invention are characterized as follows:
1. Glassy 2. Unusually high free volume within the polymer material
3. Pure gas data suggest poor selectivity
4. Measured mixed gas selectivity is substantially better than calculated pure gas selectivity
5. Selectivity of material depends on thickness

1. Glassy

The materials that have been found so far to be useful in carrying out the process of the invention have glass transition temperatures $T_g$ at least above 50° C., and typically much higher glass transition temperatures, such as above 100° C., 200° C. or even higher. Thus, they are always completely glassy and rigid under the conditions in which they are used in the process of the invention.

2. Unusually high free volume within the polymer material

The materials are also characterized by unusually high free volumes, as estimated from vapor solubility data as in W. J. Koros et al., J. Membrane Science, Vol. 2, page 165, 1977. Conventional glassy polymers typically have free volumes, $V_F$, within the polymer itself of a few percent, such as 3% for polycarbonate, or 6% for polyphenylene oxide. The materials that exhibit selectivity/thickness dependence have higher free volumes, preferably more than 10% and most preferably more than 20%. For example, PTMSP, a silicon-containing substituted polyacetylene, has a free volume of about 25% according to this method.

3/4. Pure gas data suggest poor ideal selectivity/Measured mixed gas selectivity is better than calculated pure gas ideal selectivity In the gas-separation-membrane art, two types of selectivity are commonly reported. One is the ideal selectivity, which is the calculated ratio of the measured pressure-normalized fluxes of two gases, the fluxes being measured separately, each with a pure gas sample, through a defect-free membrane sample of the same thickness, and being expressed in $cm^3(STP)/cm^2 \cdot s \cdot cmHg$ or other consistent units. The other is the actual or mixed-gas selectivity, measured with a gas mixture containing two or more gases to be separated.

As discussed in the background section above, permeability data from the published literature indicate that the glassy, high-free-volume polymer materials usable in the process of the invention have poor ideal selectivities for more condensable organic compounds over less condensable organic compounds or inorganic compounds. In fact, the data show that these materials may, in some cases, be slightly selective for the less condensable over the more condensable component, for example, methane over propane or butane.

As reported in the Examples section below, we also found that permeation tests performed with pure gas samples yielded low calculated ideal selectivities for more condensable organic compounds over less condensable organic compounds or inorganic compounds.

We found, however, that the measured mixed-gas selectivity for more condensable organic compounds over less condensable organic compounds or inorganic compounds was dramatically better than the ideal selectivity. Typically, the mixed gas selectivity was at least three times the ideal selectivity, and frequently more, such as five times, seven times or ten times the ideal selectivity.

It is certainly not unknown for a gas-separation membrane under experimental conditions or use to exhibit a lower selectivity than the ideal selectivity, for at least three possible reasons:

(i) The separation membrane has one or more defects that permit indiscriminate bulk flow of both gases, thereby lowering the selectivity. The thinner the membrane, the more likely is this to be a problem.

(ii) The separation membrane is supported on a substrate that offers a resistance to gas permeation that is not insignificant compared with the resistance of the separation membrane and, therefore, has an influence on the overall selectivity of the composite.

This phenomenon is discussed in detail in co-owned U.S. Pat. No. 4,931,181.

(iii) The mixed-gas selectivity is inherently lower than the ideal selectivity calculated from pure gas measurements. This is a very common phenomenon, often caused by plasticization or swelling of the membrane by one component in the mixture. Condensable organic compounds are very likely to cause such an effect.

It is, however, very surprising for the mixed gas selectivity to be better than the ideal selectivity, especially in the case of the gas streams to which the process of the invention can be applied.

5. Selectivity of material depends on thickness

The materials that have been found so far to be useful in carrying out the process of the invention possess a surprising and hitherto totally unsuspected property, in that, when an isotropic, essentially defect-free film of the material is used to separate one gas from another, the separation selectivity exhibited by the film depends on its thickness. The actual selectivity increases, up to a maximum value, as film thickness increases. To applicant's knowledge, this unexpected behavior has never been observed previously with any other polymer materials. The reason why this behavior is observed is not yet known, but it appears that gas transport is not conforming completely to the solution/diffusion model that is the standard approach for understanding gas transport through dense polymer films. This atrribute can be used in tailoring membrane performance to suit specific applications, and is covered more fully in co-owned and copending application, Ser. No. 971,414, filed on Nov. 4, 1992.

Non-limiting examples of the types of polymer material that fall within the definition of glassy, high-free-volume materials useful for carrying out the process of the invention include:

(i) Substituted acetylenes, having the general structural formula

where $R_1$ and $R_2$ are independently hydrogen, a halogen, $C_6H_5$ or a linear or branched $C_1$-$C_4$ alkyl group.

(ii) Silicon-containing polyacetylenes, having the general structural formula

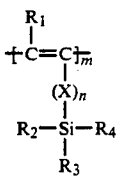

where $R_1$ is a linear or branched $C_1$–$C_4$ alkyl group, $R_2$ and $R_3$ are independently linear or branched $C_1$–$C_6$ alkyl groups, $R_4$ is a linear or branched $C_1$–$C_{12}$ alkyl or aryl group, and X is a $C_1$–$C_3$ alkyl group.

(iii) Germanium-containing polyacetylenes, having the general structural formula

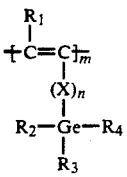

where $R_1$ is a linear or branched $C_1$–$C_4$ alkyl group, $R_2$ and $R_3$ are independently linear or branched $C_1$–$C_6$ alkyl groups, $R_4$ is a linear or branched $C_1$–$C_6$ alkyl groups, $R_4$ is a linear or branched $C_1$–$C_{12}$ alkyl or aryl group, and X is a $C_1$–$C_3$ alkyl group.

(iv) Polymers and copolymers of perfluoro-2,2-dimethyl-1,3-dioxole.

Membranes useful in the process of the invention may be formed from these glassy, high-free-volume materials in a variety of ways. Because the materials are glassy and rigid, an unsupported film of the polymer may often be usable as a single-layer gas separation membrane. Alternatively, the membrane may be an integral asymmetric membrane, comprising a dense region that forms the separation membrane and a microporous support region. As a further alternative, the membrane may be a composite membrane comprising the separation membrane and an attached or unattached backing layer, or a composite membrane comprising a microporous support membrane of one polymer coated with the separation membrane of another polymer. Applicants prefer to use composite membranes.

The membrane incorporating the separation membrane may be formed as a flat sheet, a hollow fiber or any other convenient form, and housed in any appropriate type of module, such as plate-and-frame, potted fiber or spiral-wound.

In the process of the invention, a feed gas stream containing a condensable organic compound is passed through a membrane separation step. The process is shown schematically in its very simplest form in FIG. 1. Referring to this figure, an organic compound-containing feed gas stream, 1, passes to a membrane separation unit, 2, containing one or more membranes. The membrane separation step involves running the feed gas stream across a membrane that is selectively permeable to the organic compound that is to be removed. The organic compound is concentrated in the stream, 4, permeating the membrane; the residue, non-permeating, stream, 3, is correspondingly depleted in organic compound.

If the feed gas stream to be treated is at high pressure compared with atmospheric, the separation may be effected simply by making use of this high pressure to provide an adequate driving force and pressure ratio. Otherwise, a pressure difference can be provided by compressing the feed stream, by drawing a vacuum on the permeate side of the membrane, or a combination of both.

Single-stage gas-separation processes typically remove up to about 80–95% of the preferentially permeating component from the feed stream and produce a permeate stream that has five times or more the concentration of that component of the feed gas. This degree of separation is adequate for many applications. If the residue stream requires further purification, it may be passed to a second bank of modules for a second processing step. If the permeate stream requires further concentration, it may be passed to a second bank of modules for a second-stage treatment. Such multistage or multistep processes, and variants thereof, will be familiar to those of skill in the art, who will appreciate that the process may be configured in many possible ways, including single-stage, multistage, multistep, or more complicated arrays of two or more units in series or cascade arrangements.

Optionally, the permeate stream from the membrane separation step may be recompressed and/or chilled to recover the organic compound in liquid form.

The invention is now further illustrated by the following examples, which are intended to be illustrative of the invention, but are not intended to limit the scope or underlying principles of the invention in any way.

Examples 1–3

Comparative examples with various rubbery polymers.
Not in accordance with the invention Example 1

An asymmetric, microporous polysulfone support membrane was prepared. A sealing coat of silicone rubber about 1 μm thick was applied to the skin side of the support membrane. Composite membranes were prepared by hand-coating a solution of 5 wt % ethylene/vinyl acetate (EVA, Elvax 150) in cyclohexane onto the skin side of the asymmetric support membrane by a continous dip-coating method. The polymer solution was applied at room temperature and the composite membrane was air-dried.

The membranes were tested with pure nitrogen, oxygen, and methane at 50 psig feed pressure to ensure that the EVA coating was defect-free.

The composite membranes with defect-free separation layers were evaluated in room-temperature gas-separation experiments. The membranes were mounted in a test cell exposed to a gas mixture consisting of 86% methane, 10% ethane, 3% propane and 1% butane on the feed side. The feed pressure was maintained at 500 psig and the permeate side of the membrane was at atmospheric pressure. To maintain a constant feed gas composition, gas was continuously vented from the high-pressure side to promote mixing in the cell. The compositions of the residue and permeate streams were analyzed with an on-line gas chromatograph.

The same preparation technique and permeation tests were repeated, except that the membrane was made from a 5 wt % Elvax 450 solution.

The pressure-normalized gas fluxes and the propane/methane and butane/methane selectivities of the membranes are given in Table 1.

TABLE 1

Permeation Properties of Elvax 150 and 450 Composite Membranes

| Membrane | Pressure-normalized flux ($\times 10^{-6}$ cm$^3$(STP)/cm$^2 \cdot$ s $\cdot$ cmHg) | | Selectivity | |
|---|---|---|---|---|
| | Pure methane | Methane in gas mixture | Propane/methane | Butane/methane |
| Elvax 150 | 3.5 | 6.8 | 2.8 | 5.5 |
| Elvax 450 | 1.4 | 5.6 | 1.9 | 3.0 |

Example 2

Composite membranes were prepared by coating a solution of 3 wt % chlorinated polyethylene (25% chlorine grade) in 1,1,2-trichloroethane onto an asymmetric polyamide (Trogamid) support membrane, using the same general techniques as in Example 1. Permeation tests were conducted as in Example 1.

Composite membranes were prepared by coating a solution of 4 wt % nitrile rubber (21% acrylonitrile) in methylethylketone (MEK) onto an asymmetric polyetherimide (PEI) support membrane, using the same general techniques as in Example 1. The membrane was overcoated with a sealing layer of silicone rubber. Permeation tests were conducted as in Example 1.

The pressure-normalized gas fluxes and the propane/methane and butane/methane selectivities of the membranes are given in Table 2.

TABLE 2

Permeation Properties of Polyethylene and Nitrile Rubber Membranes

| Membrane | Pressure-normalized flux ($\times 10^{-6}$ cm$^3$(STP)/cm$^2 \cdot$ s $\cdot$ cmHg) | | Selectivity | |
|---|---|---|---|---|
| | Pure methane | Methane in gas mixture | Propane/methane | Butane/methane |
| Chlorinated polyethylene | 2.0 | 4.8 | 1.7 | 2.7 |
| Nitrile rubber | 0.9 | 2.1 | 1.6 | 2.8 |

Example 3

Composite membranes were prepared by coating a solution of 8.75 wt % silicone rubber in cyclohexane onto an asymmetric polysulfone support membrane, using the same general techniques as in Example 1, but heating the membrane after coating to crosslink the silicone rubber. Permeation tests were conducted as in Example 1.

Permeation experiments were also carried out with some previously made composite membranes which consisted of a selective layer of a polybutadiene/silicone rubber blend on a polysulfone support.

The pressure-normalized gas fluxes and the propane/methane and butane/methane selectivities of the membranes are given in Table 3.

TABLE 3

Permeation Properties of Silicone Rubber and Polybutadiene Blend Membranes

| Membrane | Pressure-normalized flux ($\times 10^{-5}$ cm$^3$(STP)/cm$^2 \cdot$ s $\cdot$ cmHg) | | Selectivity | |
|---|---|---|---|---|
| | Pure methane | Methane in gas mixture | Propane/methane | Butane/methane |
| Silicone rubber | 4.2 | 5.8 | 3.7 | 6.1 |
| Polybutadiene blend | 2.3 | 3.0 | 5.0 | 9.3 |

Reviewing Examples 1-3, it may be seen that in all cases, the methane flux measured with mixed gas samples is higher than the pure methane flux. This increase in methane flux is caused by plasticization of the membrane by the higher hydrocarbons in the feed. The higher methane flux results in a lower hydrocarbon/methane selectivity. This behavior is typical of rubbery polymer membranes.

Example 4

PTMSP films of thicknesses up to about 200 μm were hard-cast from a solution of 5% PTMSP in toluene onto glass plates. The films were mounted in a test cell and pure gas permeation measurements were made, using the same general technique as in Example 1, except that pure gases only were used and the feed gas pressure was 50 psig. The apparent thickness of the PTMSP layer was obtained by dividing the nitrogen permeability coefficient by the pure pressure-normalized nitrogen flux through the membrane.

The ideal selectivity was calculated from the ratio of the pure gas pressure-normalized normalized fluxes. The results are given in Table 4.

TABLE 4

Pure-Gas Transport Properties of PTMSP

| Gas | Permeability (Barrer) | Selectivity (Gas/N$_2$) | Selectivity (Gas/CH$_4$) |
|---|---|---|---|
| Nitrogen | 6,400 | 1.0 | 0.43 |
| Oxygen | 9,600 | 1.5 | 0.65 |
| Methane | 14,800 | 2.3 | 1.0 |
| Propane | 40,000 | 6.3 | 2.7 |
| Butane | 94,000 | 14.6 | 6.4 |

These selectivities appear to be too low to make this a practical method for separating more condensable from less condensable components in gas mixtures.

Example 5

Comparison of pure-gas and mixed-gas behavior

Figure 3:
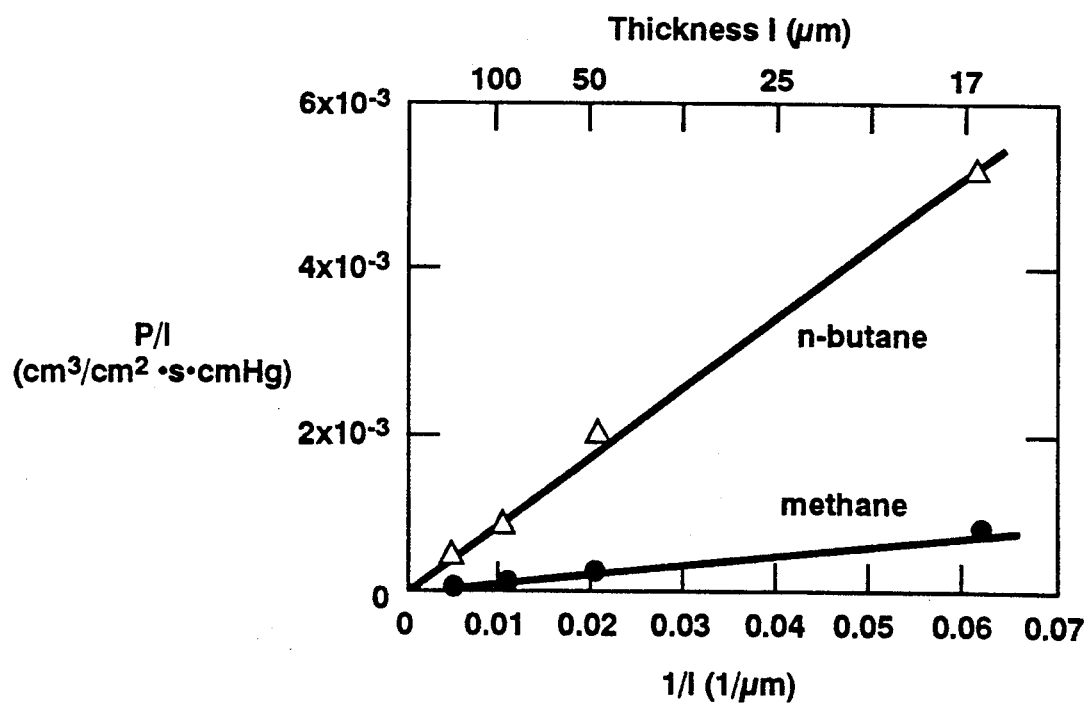
FIG. 3 is a graph of pure gas butane and methane pressure-normalize fluxes plotted as a function of inverse separation membrane thickness.

A set of experiments was performed to compare pure-gas and mixed-gas fluxes, permeabilities and selectivities. In the first experiment, PTMSP films of thicknesses 16, 48, 90 and 200 μm were prepared and tested as in Example 4, except that the gases used for the testing were pure methane and pure butane. For the methane tests, the feed pressure was maintained at 50 psig and the permeate side of the membrane was at atmospheric pressure. For the butane tests, the feed pressure was maintained at 5 psig and the permeate side of the membrane was at atmospheric pressure. The pressure-normalized methane and butane fluxes are plotted as function of inverse PTMSP film thickness in FIG. 3. As expected, both plots are straight lines, with flux increasing in inverse proportion to membrane thickness.

Figure 4:
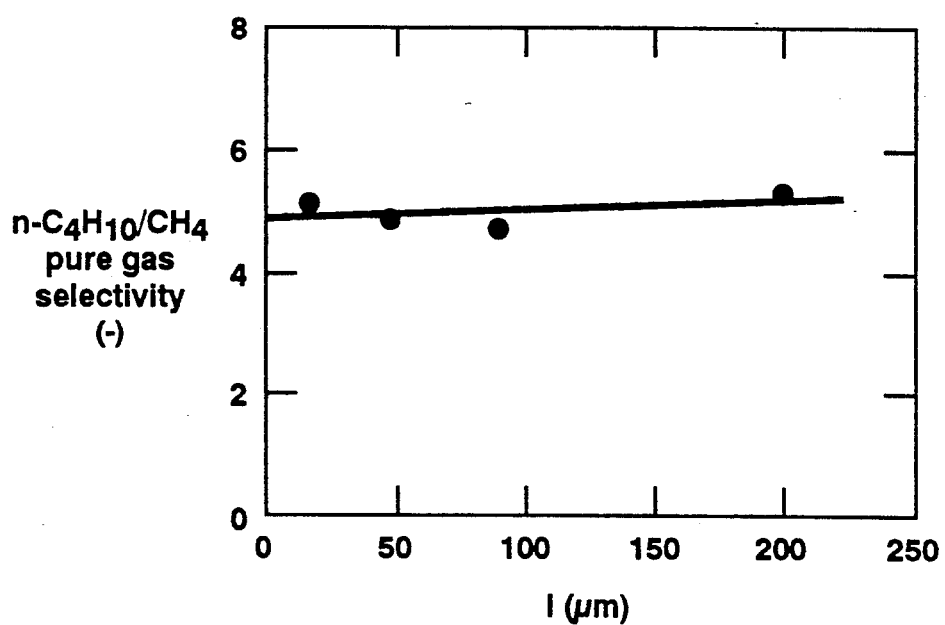
FIG. 4 is a graph of ideal butane/methane selectivity as a function of separation membrane thickness.

The ideal butane/methane selectivity was calculated from the flux data. The results are plotted in FIG. 4. As can be seen from the figure, the ideal selectivity remains essentially constant at about 5-5.5 over the thickness range. This selectivity does not appear to be high enough to make this a practical method for separating butane from methane in gas mixtures.

Figure 5:
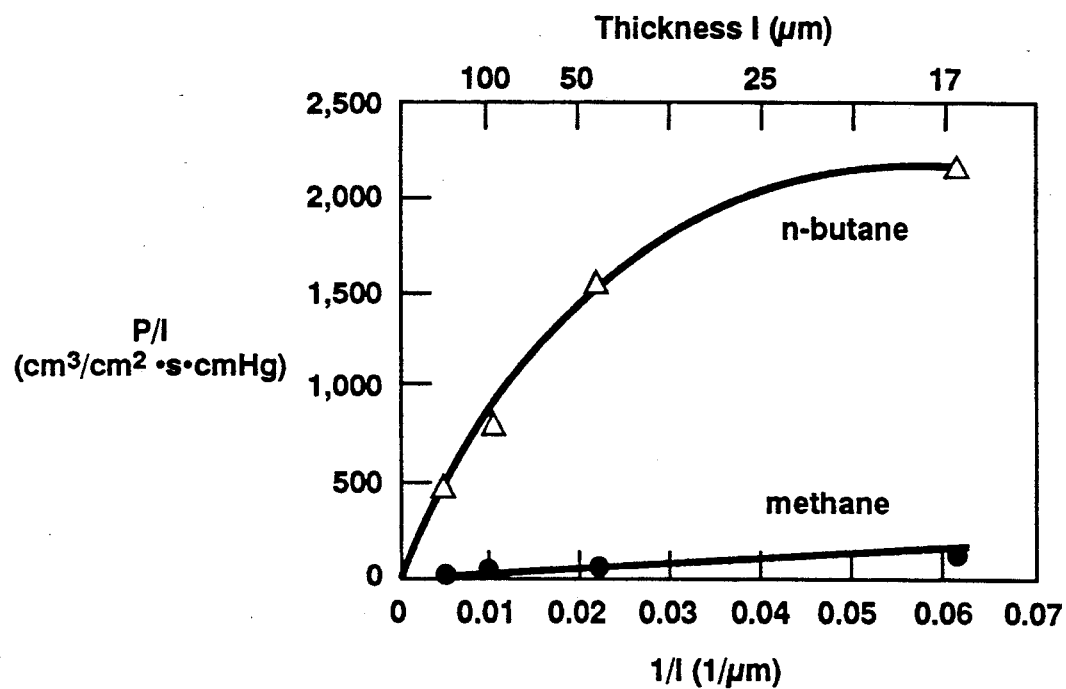
FIG. 5 is a graph of pressure-normalized fluxes plotted as a function of inverse separation membrane thickness. The fluxes were measured with a gas mixture consisting of 86% methane, 10% ethane, 3% propane and 1% butane.
Figure 6:
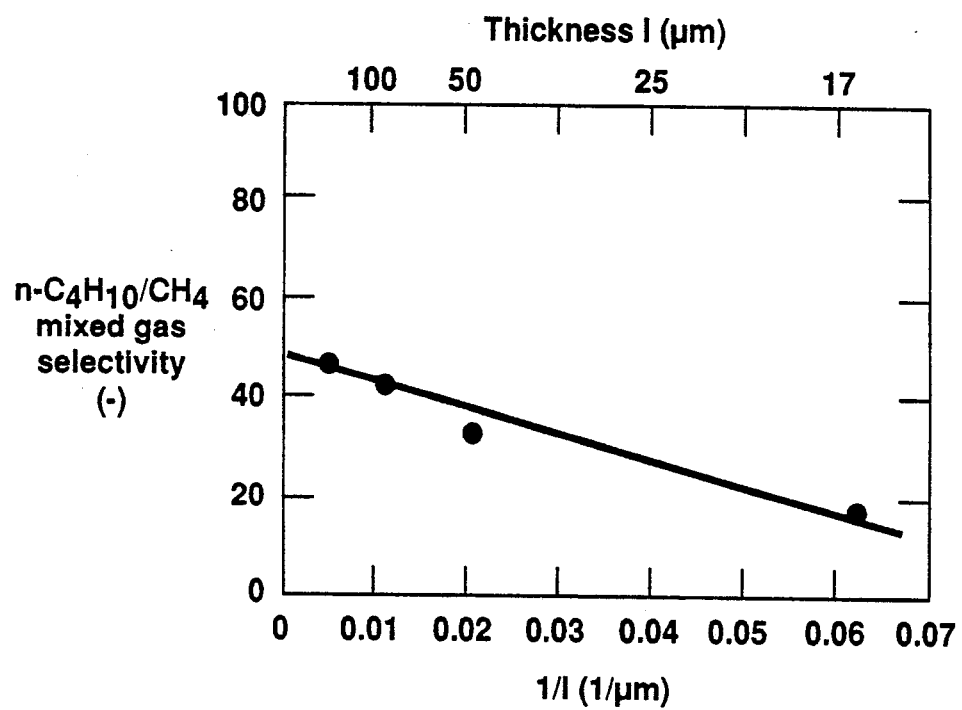
FIG. 6 is a graph of mixed gas butane/methane selectivity plotted as a function of inverse separation membrane thickness. The selectivity was measured with a gas mixture consisting of 86% methane, 10% ethane, 3% propane and 1% butane.

Permeation tests were repeated with mixed gas samples consisting of 86% methane, 10% ethane, 3% propane and 1% butane. The feed pressure was maintained at 300 psig and the permeate side of the membrane was at atmospheric pressure. The pressure-normalized methane and butane fluxes are plotted as a function of inverse PTMSP film thickness in FIG. 5. The methane plot appears to be still close to a straight line, but the butane flux is clearly no longer in direct relationship to the membrane thickness. The mixed gas selectivity is plotted as a function of the inverse PTMSP film thickness in FIG. 6. It is very clear that the selectivity is now (i) better than the ideal selectivity, and (ii) a function of membrane thickness. The maximum achievable butane/methane selectivity as measured at this feed pressure (300 psig) can be read from the ordinate of the graph and is about 50. This is about 10 times the ideal selectivity obtained from the pure gas data.

Example 6

Experimental and literature permeation data that we had gathered from a variety of rubbery, glassy and glassy, high-free-volume polymer materials was compared. A comparison of representative materials is given in Table 5.

TABLE 5

Comparison of ideal and mixed-gas selectivities for different polymers

| Membrane material | Ideal (Pure-Gas) Selectivity | | Mixed-Gas Selectivity | |
|---|---|---|---|---|
| | Propane/ methane | Butane/ methane | Propane/ methane | Butane/ methane |
| Rubber | | | | |
| Silicone rubber | 7.3 | 33 | 3.8 | 6.2 |
| Glass | | | | |
| Polysulfone | — | 0.14 | 0.51 | 0.60 |
| High-$V_F$ Glass | | | | |
| PTMSP | 2.6 | 5.6 | 8.2 | 27 |

For the typical rubbery polymer, silicone rubber, the ideal selectivity for butane/methane is more than five times greater than the actual, mixed-gas selectivity. For the typical glassy polymer, polysulfone, the polymer has an ideal butane/methane selectivity of 0.14, or a methane/butane selectivity of 7.1. The mixed-gas methane/butane selectivity is 1.7, so not only is the material methane-selective, but again the ideal selectivity is higher, about four times higher than the actual mixed-gas selectivity. In contrast, the PTMSP is butane-selective, and the actual, mixed-gas selectivity is about five times greater than the ideal selectivity.

Example 7

An asymmetric, microporous support membrane was prepared. The support membrane, when tested with pure nitrogen, exhibited a pressure-normalized nitrogen flux ranging from $1.3-3.4 \times 10^{-1}$ cm$^3$(STP)/cm$^2$.s.cmHg.

Composite membranes were prepared by coating a solution of 5% polytrimethylsilylpropyne (PTMSP) in toluene onto the skin side of the asymmetric support membrane by a continuous dip-coating method. The polymer solution was applied at a room temperature and the composite membrane was dried in an oven at 50°-60° C.

The membranes were tested with pure nitrogen, oxygen, and methane to ensure that the PTMSP coating was defect-free. The apparent thickness of the PTMSP layer was obtained by dividing the nitrogen permeability coefficient of PTMSP (~6,400 Barrers) by the pure pressure-normalized nitrogen flux through the membrane.

A second set of membranes was prepared by performing the dip-coating step twice to form a thicker separation membrane. A third set of membranes was prepared by repeating the dip-coating step three times. A fourth set of membranes was prepared by repeating the dip-coating step four times. The second, third and fourth sets of membranes were tested with pure gases as above to check for defects. The apparent thickness of the separation membrane for the two-, three-and four-times-coated membranes was calculated in the same way as for the once-coated membrane.

The composite membranes with defect-free separation layers were evaluated in room-temperature gas-separation experiments. The membranes were mounted in a test cell exposed to a gas mixture consisting of 86% methane, 10% ethane, 3% propane and 1% butane on the feed side. The feed pressure was maintained at 100 psig and the permeate side of the membrane was at atmospheric pressure. To maintain a constant feed gas composition, gas was continuously vented from the high-pressure side to promote mixing in the cell. The compositions of the residue and permeate streams were analyzed with an on-line gas chromatograph.

The apparent thickness of the PTMSP separation membrane, the pressure-normalized gas fluxes, and the propane/methane and butane/methane selectivities of the membranes are given in Table 6.

TABLE 6

Permeation Properties of PTMSP Composite Membranes

| Separation membrane thickness (μm) | Pressure-normalized flux ($\times 10^{-5}$ cm$^3$(STP)/ cm$^2 \cdot$ s $\cdot$ cmHg) | | Selectivity | |
|---|---|---|---|---|
| | Pure methane | Methane in gas mixture | Propane/ methane | Butane/ methane |
| 7 (2 coats) | — | 33 | 8 | 22 |
| 11 (3 coats) | 140 | 21 | 9 | 34 |
| 17 (4 coats) | 96 | 14 | 10 | 52 |

As can be seen from Table 6, the separation membrane exhibited a marked selectivity/thickness relationship. The very high flux of the support membrane eliminates resistance of the underlying layer as a contributing factor to the selectivity.

Example 8

PTMSP films of thickness 48 μm and 200 μm were hand-cast from a solution of 5 wt % PTMSP in toluene onto glass plates. Integrity and permeation tests were conducted as in Example 7. The gas mixture used for the permeation tests consisted of 86% methane, 10% ethane, 3% propane and 1% butane. The feed pressure was varied from 300 psig to 950 psig and the permeate side of the membrane was at atmospheric pressure. The results are given in Tables 7 and 8.

TABLE 7

Permeation Properties of 48-μm PTMSP Film at Different Feed Pressures

| Feed pressure (psig) | Pressure-normalized flux (× 10⁻⁵ cm³(STP)/ cm²·s·cmHg) | | | Selectivity | |
|---|---|---|---|---|---|
| | Methane | Propane | Butane | Propane/ methane | Butane/ methane |
| 300 | 4.8 | 42 | 150 | 8.8 | 31 |
| 500 | 5.5 | 41 | 110 | 7.5 | 20 |
| 600 | 6.1 | 42 | 96 | 6.9 | 16 |
| 800 | 5.8 | 35 | 72 | 6.0 | 12 |
| 950 | 5.9 | 32 | 61 | 5.4 | 10 |

TABLE 8

Permeation Properties of 200 μm PTMSP Film at Different Feed Pressures

| Feed pressure (psig) | Pressure-normalized flux (× 10⁻⁵ cm³(STP)/ cm²·s·cmHg) | | | Selectivity | |
|---|---|---|---|---|---|
| | Methane | Propane | Butane | Propane/ methane | Butane/ methane |
| 300 | 1.1 | 10 | 50 | 9.1 | 45 |
| 500 | 1.1 | 9.9 | 36 | 9.0 | 33 |
| 600 | 1.2 | 9.9 | 31 | 8.2 | 26 |
| 800 | 1.4 | 9.5 | 26 | 6.8 | 19 |
| 950 | 1.5 | 9.5 | 24 | 6.3 | 16 |

Tables 7 and 8 show that increasing the feed pressure lowers the selectivity. This drop in selectivity results from the simultaneous increase of methane flux and decrease of propane and butane fluxes at higher pressures.

Example 9

We prepared a 2-in diameter spiral-wound membrane module containing approximately 900 cm² of active membrane area. The membranes were composites consisting of a PTMSP layer supported on a nonwoven polyester fabric. The apparent PTMSP layer thickness was 45 μm.

The hydrocarbon separation properties of the modules were determined by permeation tests as in the previous examples, except that the module was mounted in the test system in place of the membrane test cell. The module was exposed to a feed gas mixture consisting of 86% methane, 10% ethane, 3% propane and 1% butane at feed pressures of 200, 300, and 400 psig, the maximum pressure rating of the module housing. The pressure-normalized gas fluxes and the propane/methane and butane/methane selectivities of the modules are given in Table 9.

TABLE 9

Permeation Properties of Lab-Scale PTMSP Membrane Module

| Feed pressure (psig) | Pressure-normalized flux (× 10⁻⁵ cm³(STP)/ cm²·s·cmHg) | | | Selectivity | |
|---|---|---|---|---|---|
| | Methane | Propane | Butane | Propane/ methane | Butane/ methane |
| 200 | 3.9 | 31 | 110 | 7.9 | 28 |
| 300 | 3.6 | 27 | 85 | 7.5 | 24 |
| 400 | 3.7 | 27 | 76 | 7.3 | 21 |

The results show that the module effectively separated the higher hydrocarbons from methane.

Example 10

The preparation technique and permeation tests of Example 9 were repeated, using a module incorporating a membrane made from a higher molecular weight polymer. The results are given in Table 10.

TABLE 10

Permeation Properties of Lab-Scale Module with Higher MW Polymer

| Feed pressure (psig) | Pressure-normalized flux (× 10⁻⁵ cm³(STP)/ cm²·s·cmHg) | | | Selectivity | |
|---|---|---|---|---|---|
| | Methane | Propane | Butane | Propane/ methane | Butane/ methane |
| 200 | 3.1 | 27 | 120 | 8.7 | 39 |
| 300 | 2.9 | 25 | 86 | 8.6 | 30 |
| 400 | 2.8 | 22 | 62 | 7.8 | 22 |

Comparing the results of Examples 9 and 10 with Example 8, it may be seen that the module properties are comparable with those of the membrane. Between 200 and 400 psig feed pressures, the module selectivities are 7.2–8.7 for propane/methane and 21–39 for butane/methane. These values are within the same range as those obtained for a 48- μm PTMSP film at similar pressures.

EXAMPLE 11

The preparation technique and permeation tests of Example 10 were repeated, using a gas mixture consisting of 82% methane, 10% ethane, 7% propane and 1% butane. The results are given in Table 11.

TABLE 11

Permeation Properties of Lab-Scale Module with Higher MW Polymer

| Feed pressure (psig) | Pressure-normalized flux (× 10⁻⁵ cm³(STP)/ cm²·s·cmHg) | | | Selectivity | |
|---|---|---|---|---|---|
| | Methane | Propane | Butane | Propane/ methane | Butane/ methane |
| 200 | 3.6 | 30 | 120 | 8.3 | 33 |
| 300 | 2.9 | 22 | 72 | 7.6 | 25 |
| 400 | 2.9 | 21 | 61 | 7.2 | 21 |

Once again, the results were similar to those achieved with membrane stamps of the same thickness.

Example 12

Composite membranes were prepared by dip-coating solutions of 5% polytrimethylsilylpropyne (PTMSP) in toluene onto a nonwoven polyester fabric backing. The resulting composite membranes were tested with pure nitrogen, oxygen, and methane to ensure that the PTMSP coating was defect-free. The apparent thickness of the PTMSP layer was obtained by dividing the nitrogen permeability coefficient of PTMSP (~6,400 Barrers) by the pure pressure-normalized nitrogen flux through the membrane. The fluxes were consistent with a membrane thickness of about 30 μm thick.

The composite membranes with defect-free separation layers were evaluated in room-temperature gas-separation experiments. The membranes were mounted in a test cell exposed to a gas mixture consisting of 86% methane, 10% ethane, 3% propane and 1% butane on the feed side. The feed pressure was maintained at 500 psig and the permeate side of the membrane was at atmospheric pressure. To maintain a constant feed gas composition, gas was continuously vented from the high-pressure side to promote mixing in the cell. The compositions of the residue and permeate streams were analyzed with an on-line gas chromatograph.

The permeation tests were repeated with a gas mixture saturated with hexane. Saturation was obtained at about 600 psig and 25° C. by passing the pressurized gas mixture as above through a high-pressure bubbler containing liquid hexane. The resulting feed composition was 85.77% methane, 9.6% ethane, 2.9% propane, 1.0% butane, and 0.8% hexane.

The selectivity for the various components over methane, in mixtures with and without hexane, are given in Table 12.

TABLE 12

Selectivity of PTMSP Membrane with and without n-Hexane in Gas Mixture

| Selectivity | Hexane-saturated feed | Feed mixture without hexane |
|---|---|---|
| Ethane/methane | 3.1 | 3.0 |
| Propane/methane | 6.4 | 6.2 |
| Butane/methane | 14.5 | 15.0 |
| Hexane/methane | 48.7 | — |

The results shown in Table 12 demonstrate that the butane/methane separation performance of the membrane was not affected by the presence of hexane in the feed. The selectivities obtained with the hexane-saturated feed were 3.1 for ethane/methane, 6.4 for propane/methane, and 14.5 for butane/methane. With the feed containing no hexane, the corresponding selectivities were 3.0, 6.2, and 15.0. These two sets of values differ by only 3 to 4%, well within the range of experimental error. The data also indicate that the PTMSP membrane permeated hexane 49 times faster than methane, leading to excellent hexane recovery.

Example 13

The experiment of Example 12 was repeated, except that this time a less-condensable gas, carbon dioxide, was added, so that the feed gas mixture had a composition of 86% methane, 10% carbon dioxide, 3% propane and 1% butane. The permeation tests were carried out using a spiral-wound module, as in Examples 9 and 10. The feed gas pressure was 300 psig; the permeate side of the module was at atmospheric pressure. The results are listed in Table 13.

TABLE 13

Selectivity of PTMSP Membrane with and without Carbon Dioxide in Gas Mixture

| Selectivity | $CO_2$-containing feed | Feed mixture without $CO_2$ |
|---|---|---|
| Ethane/methane | — | 3.3 |
| Propane/methane | 7.8 | 8.0 |
| Butane/methane | 25.8 | 25.7 |
| $CO_2$/methane | 2.8 | — |

No significant change in the separation properties of the membrane module was found when carbon dioxide was present in the feed. The selectivities were 7.8 for propane/methane and 25.8 for butane/methane, equivalent to the values of 8.0 and 25.7 obtained with the gas mixture without carbon dioxide. Furthermore, the mixed-gas carbon dioxide/methane selectivity of 2.8 is about 30% higher than the pure-gas value of 2.1. As expected, the pressure-normalized mixed-gas methane flux was more than 5 times smaller than the pure-gas methane flux because of the co-permeation of the larger, more condensable hydrocarbons. A similar reduction was observed for the mixed-gas carbon dioxide flux, compared to the pure-gas carbon dioxide flux. Thus, the presence of less condensable species in the feed stream did not affect the separation performance of the membrane to any significant extent.

We claim:

1. A process for recovering a condensable organic component from a gas stream, comprising the steps of:
   (a) providing an incoming gas stream containing a condensable organic component, said condensable organic component being characterized by a boiling point higher than −50° C. at atmospheric pressure;
   (b) providing a membrane having a feed side and a permeate side;
   said membrane comprising a polymer material characterized by:
      (i) a glass transition temperature, $T_g$, of at least about 100° C.,
      (ii) a free volume $V_F$ of at least about 10%;
   (c) contacting said feed side with said gas stream;
   (d) withdrawing from said permeate side a permeate stream enriched in said condensable organic component compared with said gas stream;
   (e) withdrawing from said feed side a residue stream depleted in said condensable organic component compared with said gas stream.

2. The process of claim 1, wherein said membrane is a composite membrane.

3. The process of claim 1, wherein said membrane is an asymmetric membrane.

4. The process of claim 1, wherein said glass transition temperature, $T_g$, is at least about 200° C.

5. The process of claim 1, wherein said free volume $V_F$ is at least about 20%.

6. The process of claim 1, wherein said polymer material is a substituted polyacetylene.

7. The process of claim 1, wherein said polymer material is a silicon-containing polyacetylene.

8. The process of claim 1, wherein said polymer material is a germanium-containing polyacetylene.

9. The process of claim 1, wherein said polymer is polytrimethylsilylpropyne.

10. The process of claim 1, wherein said polymer is poly(perfluoro-2,2-dimethyl-1,3-dioxole).

11. The process of claim 1, wherein said polymer material has an ideal selectivity for said condensable organic component over a second component of said gas mixture and a mixed-gas selectivity for said condensable organic component over a second component of said gas mixture and said mixed gas selectivity is greater than said ideal selectivity.

12. The process of claim 11, wherein said mixed gas selectivity is at least five times greater than said ideal selectivity.

13. The process of claim 11, wherein said mixed gas selectivity is at least ten times greater than said ideal selectivity.

14. The process of claim 1, wherein said gas mixture comprises an organic vapor in air.

15. The process of claim 1, wherein said mixture comprises an organic vapor in nitrogen.

16. The process of claim 1, wherein said gas mixture comprises an organic vapor in hydrogen.

17. The process of claim 1, wherein said gas mixture comprises an organic vapor in methane.

18. The process of claim 1, wherein said condensable organic component comprises a compound selected from the group consisting of aliphatic hydrocarbons, aromatic hydrocarbons and halogenated hydrocarbons.

19. The process of claim 1, wherein said gas mixture comprises natural gas.

20. The process of claim 1, further comprising condensing at least a portion of said permeate stream.

21. The process of claim 1, further characterized by a mixed-gas selectivity for said condensable organic component over a second component in the gas stream that is higher than the selectivity for said condensable organic component over said second component calculated from pure gas measurements.

22. The process of claim 1, wherein said residue stream is depleted by at least 80% in said condensable organic component compared with said gas stream.

23. The process of claim 1, wherein said permeate stream is enriched at least five-fold in said condensable organic component compared with said gas stream.

* * * * *